United States Patent [19]

Lazzari

[11] Patent Number: 4,698,716

[45] Date of Patent: Oct. 6, 1987

[54] SUPPORT FOR MAGNETIC RECORDING DISK AND ITS PRODUCTION PROCESS

[75] Inventor: Jean-Pierre Lazzari, Coremc, France

[73] Assignee: Commissariat a l'Energie Atomique, Paris, France

[21] Appl. No.: 696,515

[22] Filed: Jan. 30, 1985

[30] Foreign Application Priority Data

Feb. 3, 1984 [FR] France ............................. 84 01883

[51] Int. Cl.$^4$ ........................... G11B 5/82; G11B 5/70
[52] U.S. Cl. ..................................... 360/135; 427/128; 428/694
[58] Field of Search ................ 360/131, 133, 134–136; 427/128, 131; 428/694, 900

[56] References Cited

U.S. PATENT DOCUMENTS

| 3,290,692 | 12/1966 | Jacoby | 360/135 |
| 3,821,811 | 6/1974 | Klievoneit | 360/103 |
| 4,560,617 | 12/1985 | Nishimatsu et al. | 360/135 |

FOREIGN PATENT DOCUMENTS

| 56-34143 | 4/1981 | Japan | 427/131 |
| 59-82637 | 5/1984 | Japan | 360/135 |
| 59-124025 | 7/1984 | Japan | 427/131 |

*Primary Examiner*—John H. Wolff
*Assistant Examiner*—Matthew J. Bussan
*Attorney, Agent, or Firm*—Oblon, Fisher, Spivak, McClelland & Maier

[57] ABSTRACT

The support for a magnetic recording disc according to the invention comprises a metal disk covered by an organic coating and, on the latter, a thin, hard coating of a material based on hydrous silicate or silica.

4 Claims, 2 Drawing Figures

SUPPORT FOR MAGNETIC RECORDING DISK AND ITS PRODUCTION PROCESS

BACKGROUND OF THE INVENTION

1. Field of the Invention

The present invention relates to a novel support for a magnetic recording disk and to the process for the production thereof. It is more particularly used in the production of magnetic disk computer memories.

2. Discussion of Background

The supports for recording disks are metal wafers having a central hole and cut from a metal sheet having a thickness of a few millimeters, usually made from an aluminium-based alloy.

Before being covered by the magnetic coating to contain the information, said supports undergo a mechanical and chemical preparation giving them a surface state of an adequate quality to ensure that the magnetic coating covering them has a minimum of defects.

The mechanical preparation generally consists of smoothing the two faces by means of a turning operation. This leads to micro-grooves, which have micro-roughnesses, which can then be eliminated by fine polishing or anodic oxidation.

Despite the high cost of these operations, the surface state obtained is not of an adequate quality of permit the deposition of magnetic coatings containing the information with a high recording density. In order to increase this density, it has been proposed to cover the metal disks with a polymer layer. This layer is firstly spread out in the form of a prepolymer by means of a centrifuging operation and is then heated for polymerization purposes. Such a procedure is e.g. described in European Pat. No. 0 055 819, published on July 14th 1982 and entitled "A method for providing a layer of polymeric material on a substrate".

Although such a procedure improves the quality of the supports obtained, it is not free from defects. Thus, the magnetic disks produced therewith only have a limited life. The Applicant considers that the partial and progressive loss of the information contained in such disks is due to the fact that the polymer layer is a relatively soft material and that the magnetic coating covering the polymer can deform under the pressure exerted by the read head when the latter rubs against the dust particles which are inevitably deposited on the face of the disk. These repeated deformations end up by destroying complete sectors of the magnetic coating.

SUMMARY OF THE INVENTION

The object of the present invention is to provide improved supports by adding a thin coating of a hard material to the smooth organic layer previously deposited on the metal disk. This leads to a new smooth surface having a hardness sufficient to obviate the disadvantages of the prior art supports. Thus, the material used for forming this hard coating is hydrous silicate, i.e. $Si(OH)_4$, or alternatively silica.

The thickness of this hard coating is between 0.1 and a few microns (e.g. 5 microns). The organic coating is preferably a resin.

The present invention also relates to a process for producing such a support. In this process, an organic coating is deposited on a metallic disk by centrifuging. Furthermore, according to the invention, on the organic coating is deposited a thin, hard coating of a material based on hydrous silicate (silicate hydrate) or silica.

According to a first embodiment, the hard coating is deposited by centrifuging in one or more operations interspersed by annealing or baking operations.

According to a second embodiment, the hard coating is deposited by gaseous decomposition of silane in the presence of a plasma.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
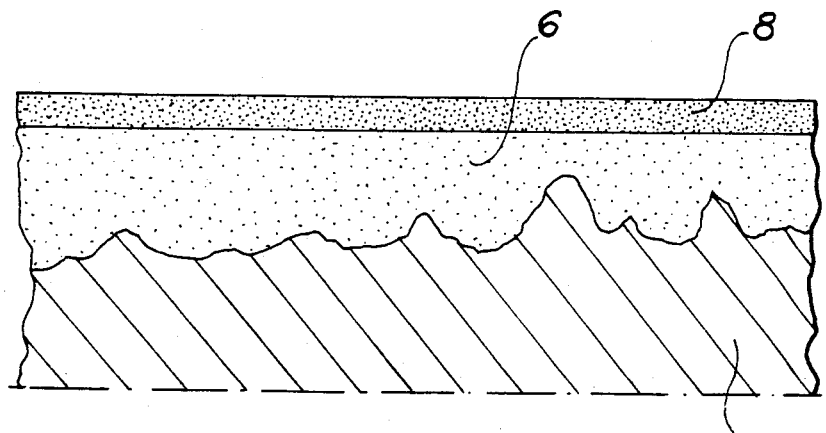
FIG. 1 a large-scale section of a support according to the invention.

FIG. 1 shows a large-scale view of a section through an aluminium disk 2. Following the conventional degreasing, cleaning and brushing operations a coating, which is preferably of a resin similar to that used in photolithography, is deposited by centrifuging. The total thickness of the resin must be such that it completely covers the surface roughnesses of the disk 2 and is between 1 and 30 $\mu$m. For this purpose, the resin can be spread out in several passes, separated by an annealing operation at a temperature between 100° and 150° C., in order to stabilize the resin. Coating in several passes has the effect of minimizing the number of surface defects. After reaching the requisite thickness, which is between 1 and 30 $\mu$m as a function of the support surface roughness, the coating 6 is baked at a higher temperature, which can reach 220° C., in order to crosslink the coating, which increases its hardness and stability.

The resin coating 6 essentially has a levelling function. However, as explained hereinbefore, its hardness does not make it possible to accept the magnetic coating containing the information, which is very thin and which must be able to withstand the impacts of the read-write head during its travel, or during the engagement and disengagement phases.

As a result of its hardness, coating 8 ensures that the information-containing magnetic coating has a stable base. The material forming the coating 8 is of hydrous silicate (with or without an organic radical) deposited in liquid form by centrifuging and annealing at a temperature between 100° and 250° C. The thickness of the hard coating is between 0.1 and a few microns. In order to minimize the number of surface defects, it is preferable to deposit the hard coating in a number of passes interspersed by baking or annealing operations.

Hard coating 8 can also be of silica, which is then deposited by the gaseous decomposition of silane in the presence of a plasma.

Figure 2:
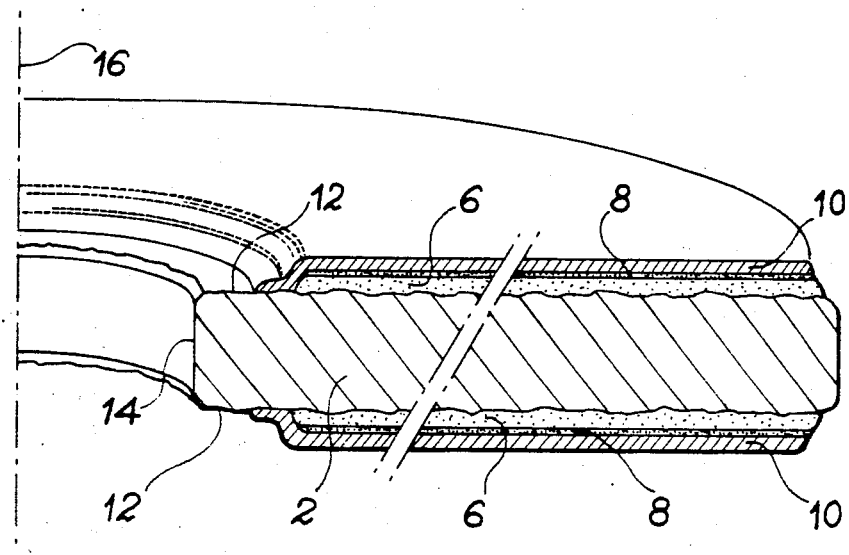
FIG. 2 the cross-section through a magnetic disk obtained with the aid of the support according to the invention.

FIG. 2 shows in cross-section, a magnetic disk obtained from the support according to the invention by adding a magnetic coating 10. Generally the two faces of the metal disk 2 are treated in the same way.

A guard ring 12 around the central hole 14, close to the axis 16 of the disk is produced by photolithography, so as to leave the metal surface of the disk 2 bare. The guard ring 12 has a double function. Thus, it makes it possible for the not shown, disk retaining ring to secure the same on a mechanically stable surface (there would be a risk of coatings 8 and 6 cracking under pressure and of producing fine particles which could be prejudicial to the travel of the head). It makes it possible to remove by means of disk 2 electrical charges which could accumulate in the magnetic coating during rotation, so that said coating partly covers ring 12.

What is claimed is:

1. A support for a magnetic recording disk comprising:

a metal disk covered by an organic coating;

a thin, hard coating on said organic coating wherein said thin, hard coating is a material comprising hydrous silicate or silica.

2. A support according to claim 1, wherein the hard coating has a thickness between 0.1 and 5 microns.

3. A support according to claim 1, wherein the organic coating is of a photosensitive resin.

4. A support according to claim 1, wherein the metal disk comprises, in its centre, a ring-like area, which is not covered by the organic coating and the hard coating.

* * * * *